(12) United States Patent
Burke et al.

(10) Patent No.: US 8,449,430 B2
(45) Date of Patent: May 28, 2013

(54) TRANSVERSELY MOUNTED TRANSAXLE HAVING A LOW RANGE GEAR ASSEMBLY AND POWERTRAIN FOR A VEHICLE INCLUDING SAME

(75) Inventors: Bobbie Burke, North Lewisburg, OH (US); Andrew J. Fox, Powell, OH (US); Shoji Tokushima, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 395 days.

(21) Appl. No.: 12/847,639

(22) Filed: Jul. 30, 2010

(65) Prior Publication Data

US 2011/0195812 A1 Aug. 11, 2011

Related U.S. Application Data

(60) Provisional application No. 61/301,856, filed on Feb. 5, 2010.

(51) Int. Cl.
*F16H 3/44* (2006.01)
(52) U.S. Cl.
USPC .......................................... 475/314; 475/303
(58) Field of Classification Search
USPC ................. 475/204, 303, 314, 320, 210, 212, 475/213
See application file for complete search history.

(56) References Cited

U.S. PATENT DOCUMENTS

| | | |
|---|---|---|
| 4,601,359 A | 7/1986 | Weismann et al. |
| 4,630,704 A | 12/1986 | Yamakawa et al. |
| 4,768,609 A | 9/1988 | Taga et al. |
| 4,955,848 A | 9/1990 | Kotajima |
| 4,974,473 A | 12/1990 | Hatakeyama |
| 5,020,626 A | 6/1991 | Kodama |
| 5,054,335 A | 10/1991 | Andrews |
| 5,056,614 A | 10/1991 | Tokushima et al. |
| 5,058,700 A | 10/1991 | Shibahata |
| 5,119,900 A | 6/1992 | Watanabe et al. |
| 5,135,071 A | 8/1992 | Shibahata et al. |
| 5,141,072 A | 8/1992 | Shibahata |
| 5,353,889 A | 10/1994 | Hamada |
| 5,411,110 A | 5/1995 | Wilson et al. |
| 5,456,641 A | 10/1995 | Sawase |
| 5,669,850 A | 9/1997 | Dourra et al. |
| 5,728,022 A | 3/1998 | Schultz |
| 5,924,952 A * | 7/1999 | Bowen .......................... 475/313 |

(Continued)

FOREIGN PATENT DOCUMENTS

| | | |
|---|---|---|
| DE | 4409224 A1 | 10/1994 |
| WO | 2008/016537 A2 | 2/2008 |

*Primary Examiner* — Justin Holmes
*Assistant Examiner* — Lillian Nguyen
(74) *Attorney, Agent, or Firm* — Kenealy Vaidya LLP

(57) ABSTRACT

A transaxle can include a housing, a low range gear assembly, and a differential gear assembly. The low range gear assembly can be mounted in the housing and can include a ring gear, a carrier, planet gears, a sun gear, and a clutch. The ring gear, the carrier, and the sun gear can be mounted in the housing. The planet gears can be rotatably mounted on the carrier and can engage the ring gear while the sun gear can engage the planet gears. The clutch can be selectively movable between a first position where the clutch engages each of the sun gear and the carrier and permits rotation of the sun gear relative to the housing and a second position where the clutch engages each of the sun gear and the housing and rotationally fixes the sun gear relative to the housing.

24 Claims, 3 Drawing Sheets

U.S. PATENT DOCUMENTS

| | | | |
|---|---|---|---|
| 5,989,146 | A | 11/1999 | Brown et al. |
| 6,042,504 | A | 3/2000 | Gualtieri et al. |
| 6,056,666 | A | 5/2000 | Williams |
| 6,064,934 | A | 5/2000 | Zhang |
| 6,086,515 | A | 7/2000 | Buschmann et al. |
| 6,095,276 | A | 8/2000 | Kuroda et al. |
| 6,105,703 | A | 8/2000 | Kuroda et al. |
| 6,213,242 | B1 | 4/2001 | Rodrigues et al. |
| 6,251,045 | B1 | 6/2001 | Oliveira et al. |
| 6,257,082 | B1 | 7/2001 | Ore |
| 6,549,840 | B1 | 4/2003 | Mikami et al. |
| 6,579,208 | B2 | 6/2003 | Oliveira et al. |
| 6,697,725 | B1 | 2/2004 | Williams |
| 6,699,151 | B2 | 3/2004 | Grogg et al. |
| 6,725,989 | B1 | 4/2004 | Krisher et al. |
| 6,814,682 | B2 | 11/2004 | Spitale |
| 6,817,434 | B1 | 11/2004 | Sweet |
| 6,848,555 | B2 | 2/2005 | Sakata et al. |
| 6,942,592 | B1 | 9/2005 | Haka |
| 7,004,874 | B2 | 2/2006 | Mizon et al. |
| 7,021,445 | B2 | 4/2006 | Brissenden et al. |
| 7,062,984 | B2 | 6/2006 | Haka |
| 7,086,987 | B2 | 8/2006 | Janson et al. |
| 7,136,735 | B2 | 11/2006 | Carlson et al. |
| 7,217,209 | B2 | 5/2007 | Saito et al. |
| 7,343,998 | B2 | 3/2008 | Morin et al. |
| 7,349,776 | B2 | 3/2008 | Spillane et al. |
| 7,442,148 | B2 | 10/2008 | Eckle et al. |
| 7,455,134 | B2 | 11/2008 | Severinsky et al. |
| 7,458,917 | B2 | 12/2008 | Yoshikawa et al. |
| 7,549,497 | B2 | 6/2009 | Homan et al. |
| 7,678,003 | B2 * | 3/2010 | Janson et al. .................... 475/5 |
| 2002/0155916 | A1 * | 10/2002 | Brown et al. ................ 475/204 |
| 2003/0211913 | A1 | 11/2003 | Spitale |
| 2004/0029673 | A1 | 2/2004 | Lipman |
| 2004/0099459 | A1 | 5/2004 | Nakasako et al. |
| 2005/0004732 | A1 | 1/2005 | Berry et al. |
| 2006/0111823 | A1 | 5/2006 | Tamai |
| 2007/0010927 | A1 | 1/2007 | Rowley et al. |
| 2007/0016351 | A1 | 1/2007 | Allen et al. |
| 2007/0049451 | A1 | 3/2007 | Mizon et al. |
| 2007/0093347 | A1 | 4/2007 | Janson et al. |
| 2007/0096557 | A1 | 5/2007 | Tamai et al. |
| 2007/0219695 | A1 | 9/2007 | Chiu et al. |
| 2007/0281823 | A1 * | 12/2007 | Hun ............................ 475/303 |
| 2007/0299581 | A1 | 12/2007 | Torralbo et al. |
| 2008/0046158 | A1 | 2/2008 | Carey et al. |
| 2009/0032359 | A1 | 2/2009 | Asano |
| 2009/0032360 | A1 | 2/2009 | Asano |
| 2009/0099762 | A1 | 4/2009 | Heinzmann et al. |

* cited by examiner

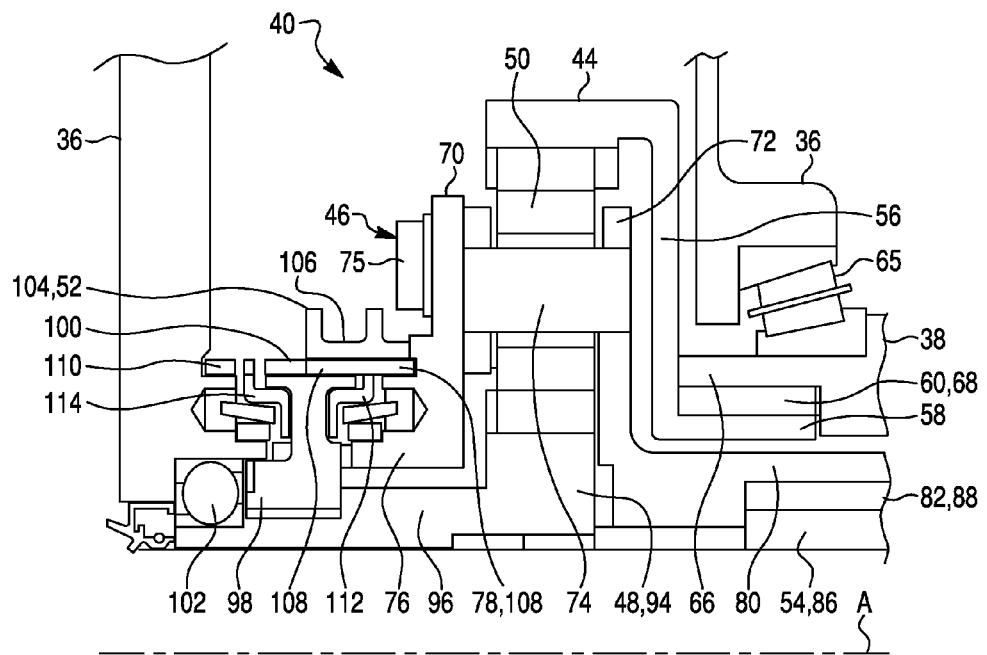
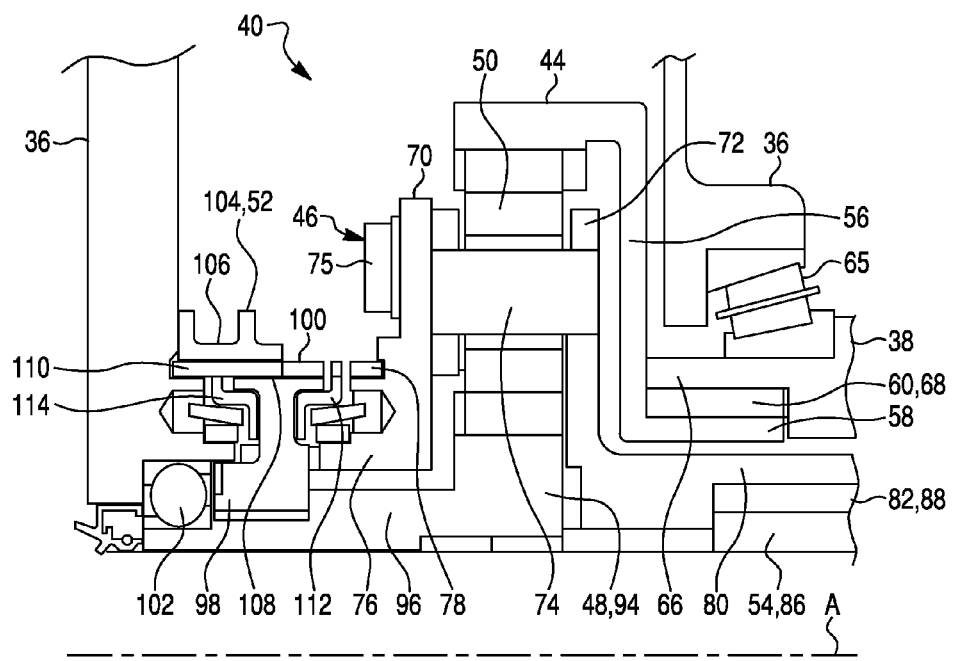

TRANSVERSELY MOUNTED TRANSAXLE HAVING A LOW RANGE GEAR ASSEMBLY AND POWERTRAIN FOR A VEHICLE INCLUDING SAME

CROSS REFERENCE TO RELATED APPLICATIONS

This application claims priority under 35 U.S.C. 119(e) to U.S. Provisional Application No. 61/301,856 filed on Feb. 5, 2010, the disclosure if which is also incorporated herein by reference.

BACKGROUND

1. Field

The presently disclosed subject matter relates to devices, systems, and processes useful as a transversely mounted transaxle having a low range gear assembly for use in a vehicle and a vehicle powertrain including the same.

2. Description of the Related Art

Existing powertrains for vehicles include a power source such as an internal combustion engine, electric engine, hybrid power source, and possibly other types of power sources. The powertrains can include a multi-ratio transmission with output shafts oriented in a longitudinal direction or a transverse direction of the vehicle. The front wheels, rear wheels, or all four wheels of existing vehicles can be driven by the power source and transmission.

In order to meet packaging targets and/or weight distribution targets, it is known to integrate the differential assembly with the multi-ratio transmission. Such an integrated assembly is known as a transaxle. The transaxle can be mounted at the rear of a vehicle and the rear driveshaft(s) can be mounted to and pass through the transaxle in the case of a rear-wheel drive configuration for the vehicle. Similarly, the transaxle can be mounted at the front of the vehicle and the front driveshafts can be mounted to and pass through the transaxle in the case of a front-wheel drive configuration, or a four-wheel drive configuration, or an all-wheel drive configuration for the vehicle.

Typical four-wheel drive vehicles have their engine and transmission arranged in a longitudinal layout. In these typical vehicles, a transfer case, that is a separate powertrain component from the engine and the transmission, supplies the drive torque to each of the front and rear axles. The transfer case typically includes a gear reduction assembly that provides a high range drive ratio typically used for normal driving speeds and conditions, and a low range drive ratio usable at low driving speeds on off-road terrain, low traction surfaces, and during high torque requirement situations, as well as during other driving conditions. The longitudinal layout for the transmission and powertrain that is typically used reduces interior volume of the vehicle because the floor of the passenger compartment is raised to accommodate the bulk of the transmission and the transfer case.

Conventional front-wheel drive powertrains are mounted transversely on the vehicle within the engine compartment. As a result, there is little or no intrusion of the powertrain into the passenger compartment.

There is a trend to supplement the transversely mounted front-wheel drive powertrains with four-wheel and/or all-wheel drive capability. Such conventional vehicles typically do not include a transfer case nor do they typically provide a low range final drive ratio. The passenger compartment floor may only need to accommodate the propeller shaft and the rear differential assembly. As a result, the powertrain has little or no impact on the interior space of the passenger compartment.

Accordingly, there is a need for a four-wheel drive and/or all-wheel drive powertrain that provides a two speed final drive assembly that can be packaged substantially within the engine compartment and that can minimize intrusion into the passenger compartment of a vehicle.

SUMMARY

According to one aspect of the disclosure a transaxle for driving at least a pair of wheels of a vehicle that are spaced apart in a transverse direction relative to the vehicle can include a housing, a low range gear assembly, and a differential gear assembly. The low range gear assembly can be mounted in the housing and can include a ring gear, a carrier, a plurality of planet gears, a sun gear, and a clutch. The ring gear, the carrier, and the sun gear can be mounted in the housing to rotate about an axis parallel to the transverse direction. The plurality of planet gears can be rotatably mounted on the carrier and can engage the ring gear. The sun gear can engage the plurality of planet gears. The clutch can be mounted in the housing. The clutch can be selectively movable between a first position where the clutch engages each of the sun gear and the carrier and permits rotation of the sun gear relative to the housing and a second position where the clutch engages each of the sun gear and the housing and rotationally fixes the sun gear relative to the housing. The differential gear assembly can be mounted in the housing and can permit one of the pair of wheels to rotate relative to the other of the pair of wheels. The differential gear assembly can include an input member, first and second output structures, and first and second driveshafts. The input member and the first and second driveshafts can be mounted in the housing to rotate about the axis. The input member can be driven by the carrier. The first and second output structures can each be connected to and driven by the input member. The first driveshaft can be connected to the first output structure and a first one of the pair of wheels and can pass through each of the sun ring gear, the carrier, and the sun gear. The second driveshaft can be connected to the second output structure and a second one of the pair of wheels.

According to an aspect of the disclosed subject matter, a powertrain assembly for a vehicle can include a front pair of wheels, a rear pair of wheels, an internal combustion engine, a multi-ratio transmission, a final drive gear, a low range gear assembly, a front differential gear assembly, a power take-off assembly, a rear differential assembly, and first and second rear driveshafts. The front pair of wheels can be spaced apart in a transverse direction relative to the vehicle. The rear pair of wheels can be spaced apart in the transverse direction and can be spaced from the front pair of wheels in a longitudinal direction relative to the vehicle. The internal combustion engine can be aligned parallel to the transverse direction and can be mounted to the vehicle intermediate each wheel of the front pair of wheels. The multi-ratio transmission can be aligned parallel to the transverse direction, can be mounted to the vehicle intermediate each wheel of the front pair of wheels and can be driven by the engine. The multi-ratio transmission can include a plurality of forward drive ratios, a reverse drive ratio, and an output gear. The output gear can rotate about an output axis parallel to the transverse direction. The final drive gear can be mounted in the housing for rotation about the axis and can engage and can be driven by the output gear. The low range gear assembly can include a ring gear, a carrier, a plurality of planet gears, a sun gear, a clutch, and an output member. The ring gear can be mounted in the housing to rotate about an axis parallel to the transverse direction and can be connected to and driven by the final drive gear. The carrier can be mounted in the housing to rotate about the axis. The plurality of planet gears can be rotatably mounted on the carrier and can engage the ring gear. The sun gear can be mounted in the housing to rotate about the axis and can engage the plurality of planet gears. The clutch can be mounted in the housing. The clutch can be selectively movable between a first position where the clutch engages each of the sun gear and the carrier and permits rotation of the sun gear relative to the housing and a second position where the clutch engages each of the sun gear and the housing and rotationally fixes the sun gear relative to the housing. The output member can be connected to the carrier and driven by the carrier at one of a high range final drive ratio and a low range final drive ratio that is less than the high range final drive ratio. The high range final drive ratio can be determined by the output gear, the final drive gear, and the first position of the clutch and can be independent of each of the plurality of forward drive ratios and the reverse drive ratio. The low range final drive ratio can be determined by the output gear, the final drive gear, and the second position of the clutch and can be independent of each of the plurality of forward drive ratios and the reverse drive ratio. The front differential gear assembly can include an input member, first and second output structures, first and second driveshafts, and a third output structure. The input member can be mounted in the housing to rotate about the axis and can be driven by the output member. Each of the first output structure and a second output structure can be connected to and driven by the input member. The first driveshaft can be mounted in the housing to rotate about the axis, can be connected to the first output structure and a first one of the pair of wheels, and can pass through each of the sun ring gear, the carrier, and the sun gear. The second driveshaft can be mounted in the housing to rotate about the axis and can be connected to the second output structure and a second one of the pair of wheels. The power take-off gear assembly can include a crown gear, a pinion gear, and a propeller shaft. The crown gear can be driven by the third output structure to rotate about an axis parallel to the transverse direction. The pinion gear can engage the crown gear and can rotate about an axis parallel to the longitudinal direction. The propeller shaft can be driven by the pinion gear and can extending along an axis parallel to the longitudinal direction. The rear differential gear assembly can be driven by the propeller shaft. The first rear driveshaft can be connected to and driven by the rear differential gear assembly and can be connected to and drive a first one of the rear pair of wheels. The second rear driveshaft can be connected to and driven by the rear differential gear assembly and can be connected to and drive a second one of the rear pair of wheels.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is an enlarged cross-sectional view of a portion of FIG. 2, showing a clutch of the two-speed final drive assembly in a first position.

FIG. 4 is an enlarged view of the same portion of FIG. 2, showing the clutch in a second position.

DETAILED DESCRIPTION OF EXEMPLARY EMBODIMENTS

Figure 1:
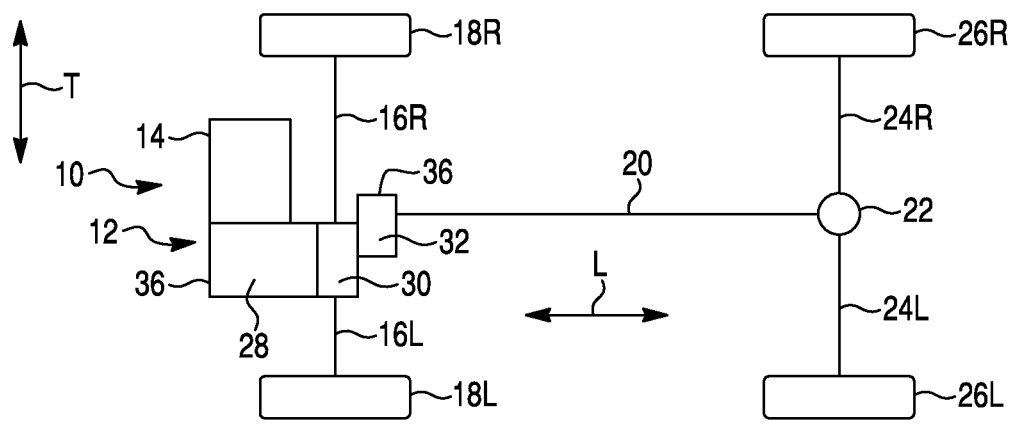
FIG. 1 is a schematic view of a powertrain of a vehicle made in accordance with principles of the disclosed subject matter.

FIG. 1 schematically represents a powertrain of a vehicle 10 that includes an embodiment of a transaxle 12 made in accordance with principles of the disclosed subject matter. The vehicle 10 can be configured as a four-wheel drive vehicle or an all-wheel drive vehicle and can also include a power source, such as an internal combustion engine 14, a pair of front driveshafts 16L, 16R, a pair of front wheels 18L, 18R, a propeller shaft 20, a rear differential assembly 22, a pair of rear driveshafts 24L, 24R, and a pair of rear wheels 26L, 26R.

Each of the driveshafts 16L, 16R, 24L, 24R can extend in a transverse direction (indicated by arrows T) of the vehicle 10. The rear driveshafts 24L, 24R can be spaced from the front driveshafts 16L, 16R in a longitudinal direction (indicated by arrows L) of the vehicle 10—which direction is perpendicular to the transverse direction T. Each of the front driveshafts 16L, 16R can be connected to and driven by the transaxle 12. Each of the rear driveshafts 24L, 24R can be connected to and driven by the rear differential 22.

The left front wheel 18L can be connected to and driven by the left front driveshaft 16L. The right front wheel 18R can be connected to and driven by the right front driveshaft 16R. The left rear wheel 26L can be connected to and driven by the left rear driveshaft 24L, and the right rear wheel 26R can be connected to and driven by the right rear driveshaft 24R.

Each of the internal combustion engine 14 and the transaxle 12 can be oriented with their output shafts (not shown) in the transverse direction T of the vehicle 10. The internal combustion engine 14 can be connected to the transaxle 12 to drive the transaxle 12, in a manner known in the art.

The propeller shaft 20 can extend in the longitudinal direction L of the vehicle 10 and can be connected to each of the transaxle 12 and the rear differential assembly 22. The propeller shaft 20 can be driven by the transaxle 12 and can drive the rear differential assembly 22.

The transaxle 12 can include a multi-ratio transmission 28, a two-speed final drive assembly 30 and a power take-off assembly 32. The transaxle 12 can be configured such that it is accommodated within the engine compartment (not shown) of the vehicle 10. Accordingly, the passenger compartment of the vehicle 10 need not accommodate the transaxle 12.

Figure 2:
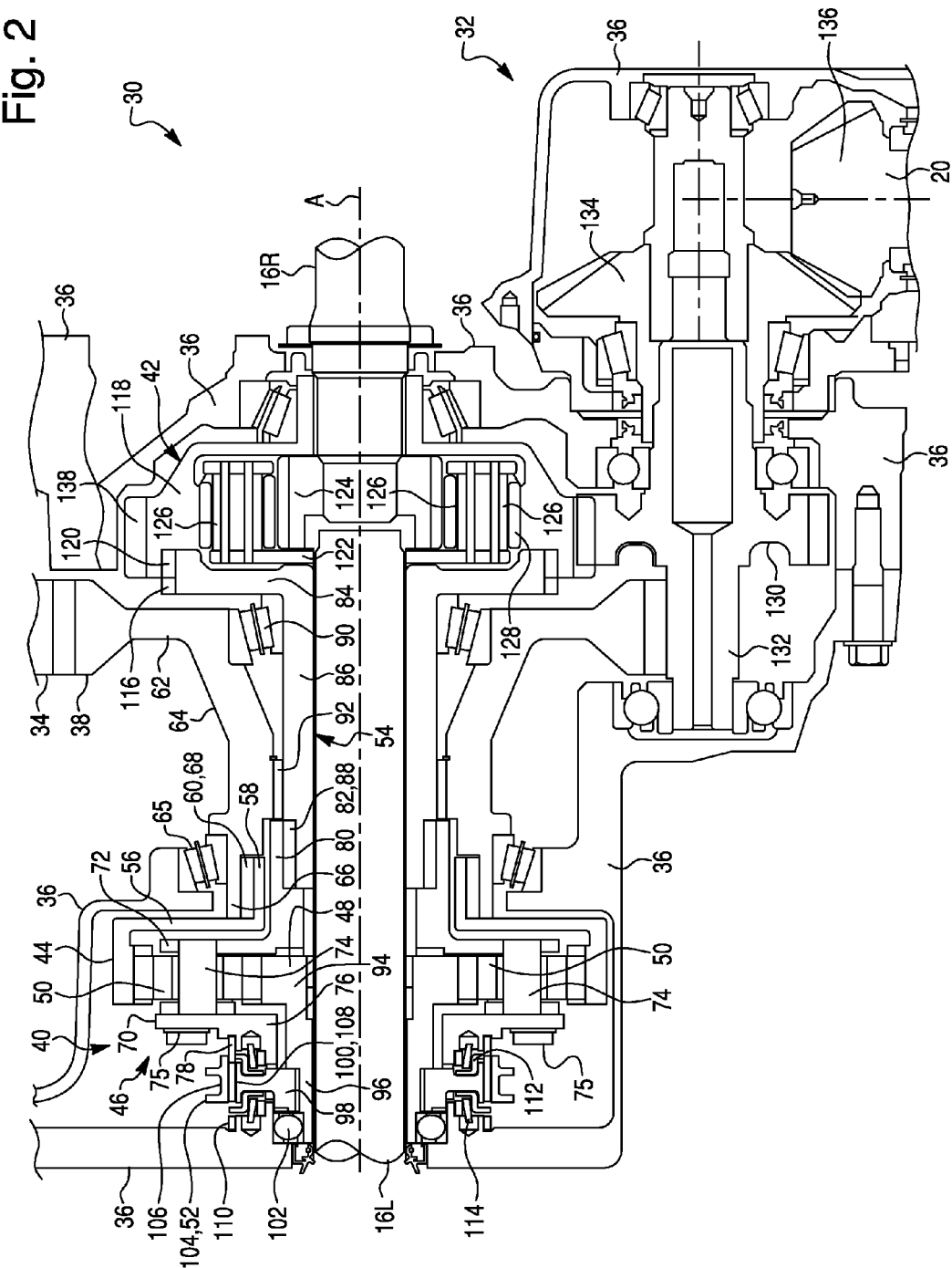
FIG. 2 is a cross-sectional view of a two-speed final drive assembly and a power take-off assembly of the transaxle shown in FIG. 1.

The multi-ratio gear transmission 28 can be connected to and driven by the internal combustion engine 14 in a manner that is known in the art. The multi-ratio transmission 28 can include a plurality of drive ratios and an output gear 34 (FIG. 2). The output gear 34 can be driven at an output speed that is a function of the speed of the internal combustion engine 14 and the selected one of the drive ratios. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatic transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The two-speed final drive assembly 30 can be driven by the output gear 34 and can drive each of the front driveshafts 16L, 16R and the power take-off assembly 32 based on a selected one of a high range final drive ratio and a low range final drive ratio. Each of the high range final drive ratio and the low range final drive ratio can be selected independent of the ratio selected in the multi-ratio transmission 28. That is, the two-speed final drive assembly 30 can provide the selected one of the high range final drive ratio and the low range final drive ratio with any one of the forward ratios and the reverse ratio selected in the multi-ratio transmission 28. The two-speed final drive assembly 30 can provide a high range gearing that corresponds to the high range final drive ratio and low range gearing that corresponds to the low range final drive ratio. The high range gearing can be used for normal driving conditions, such as driving on a level surface, driving at highway speeds, driving on a dry road, etc. The low range gearing can be used for special driving conditions, such as driving on low traction surfaces, off-road driving, towing a trailer on an inclined surface at low speeds, starting from a stop with a trailer attached to the vehicle 10, etc. Selection of the high range gearing and the low range gearing can be performed manually by the driver of the vehicle 10 in a manner known in the art. Alternatively, the selection of the high range gearing and the low range gearing can be performed automatically in a manner such as that disclosed in co-pending U.S. patent application Ser. No. 12/847,673 (entitled Control System and Method For Automatic Selection of a Low Range Gear Ratio For A Vehicle Drivetrain), filed concurrently herewith, and incorporated herein by reference.

The transaxle 12 can include a housing 36 in which the output gear 34 and the remaining components of the multi-ratio transmission 28 are mounted, as is known in the art. See, for example, U.S. Pat. No. 4,974,473, referenced above. The housing 36 can also contain the two-speed final drive assembly 30 and the power take-off assembly 32.

The details of the two-speed final drive assembly 30 are described with reference to FIG. 2. The two-speed final drive assembly 30 can include a final drive gear 38, a low range gear assembly 40, and a front differential assembly 42. The final drive gear 38 can include teeth (not numbered) that engage teeth (not numbered) formed on the output gear 34 of the transmission and can be driven by the output gear 34. The final drive gear 38 can drive the low range gear assembly 40 at a final drive ratio that is determined by the output gear 34 and the final drive gear 38. The low range gear assembly 40 can drive the front differential assembly 42 at the selected one of the high range final drive ratio and the low range final drive ratio, as will be discussed below. The left front driveshaft 16L can pass through the low-range gear assembly 40 and can be connected to and driven by the front differential assembly 42. The right front driveshaft 16R can also be connected to and driven by the front differential assembly 42. The front differential assembly 42 can permit the front driveshafts 16L, 16R to rotate relative to the low-range gear assembly 40, as will be discussed below.

In the frame of reference provided by FIG. 2, the low range gear assembly 40 can be located adjacent a left side of the housing 36 and centered about an axis A that extends in a transverse direction T (FIG. 1) of the vehicle 10. The front differential assembly 42 can be located adjacent a right side of the housing 36, spaced from the low range gear assembly 40 in the transverse direction T, and substantially centered about the axis A. The final drive gear 38 can be mounted in the housing 36 for rotation about the axis A and located along the axis A at a position intermediate the low range gear assembly 40 and the front differential assembly 42.

The low range gear assembly 40 can be configured as a planetary gear set which includes a ring gear 44, a carrier 46, a sun gear 48, a plurality of planet gears 50, a clutch 52, and an output member 54. Each of the final drive gear 38, the ring gear 44, the carrier 46, the sun gear 48, and the output member 54 can be mounted in the housing 36 for rotation about the axis A. Each of the ring gear 44, the sun gear 48, and the planet gears 50 can be provided with gear teeth (not numbered) such that the gear teeth of the planet gears 50 mesh with the gear teeth of each of the ring gear 44 and the sun gear 48.

The ring gear 44 can be connected to the final drive gear 38 by an input disc 56. The input disc 56 can be integrally formed with the ring gear 44 to define a single, homogenous input component of the low range gear assembly 40. The input disc 56 can rotate about the axis A and can be positioned intermediate the final drive gear 38 and the carrier 46. The input disc 56 can include a collar 58 and a plurality of external splines 60 formed on the outer surface of the collar 58. The collar 58 can be generally cylindrical in shape and can extend along the axis A toward the final drive gear 38.

The final drive gear 38 can include a gear disc 62 and a hub 64 that can extend along the axis A from the gear disc 62 toward the low range gear assembly 40. The final drive gear 38 can be rotatably supported in the housing 36 by a tapered roller bearing assembly 65. The tapered roller bearing assembly 65 can be positioned at an end of the hub 64 that is spaced from the gear disc 62 along the axis A. The hub 64 can include a sleeve 66 inside which a plurality of internal splines 68 can be formed. The internal splines 68 can engage the external splines 60 of the input disc 56. Accordingly, the ring gear 44 can be connected to the final drive gear 38 and can rotate at the same speed as the final drive gear 38. The hub 64 and the sleeve 66 can be generally cylindrical in shape.

The carrier 46 can include a pair of carrier plates 70, 72 that can be spaced apart along the axis A and connected to one another by a plurality of pinion shafts 74 and a plurality of fasteners 75. The pinion shafts 74 can be rotationally fixed to at least one of the carrier plates 70, 72 and the planet gears 50 can be mounted for rotation about the respective pinion shafts 74. Alternatively, the pinion shafts 74 can be rotatably mounted on at least one of the carrier plates 70, 72 and the planet gears 50 can be rotationally fixed to the respective pinion shafts 74. In this latter example, the planet gears 50 can be integrally formed with the respective pinion shafts 74 to define a single, homogenous component.

The first carrier plate 70 can include hub 76 and a plurality of external splines 78 formed on the hub 76. The hub 76 can extend along the axis A away from the ring gear 44 and toward the left side (as viewed in FIG. 2) of the housing 36. The hub 76 can be spaced radially from the sun gear 48. The hub 76 can be generally cylindrical in shape.

The second carrier plate 72 can include a sleeve 80 inside which a plurality of internal splines 82 can be formed. The sleeve 80 can extend along the axis A away from the ring gear 44 and toward the final drive gear 38. The sleeve 80 can be generally cylindrical in shape.

The output member 54 can be connected to the second carrier plate 72 and can rotate at the same speed as the carrier 46. The output member 54 can include an output disc 84, a second collar, such as but not limited to an elongated collar 86, and a plurality of external splines 88. The output disc 84 can be connected to the front differential assembly 42 and can be located along the axis A at a position intermediate the gear disc 62 and the front differential assembly 42. The elongated collar 86 can extend along the axis A from the output disc 84 toward the second carrier plate 72. The elongated collar 86 can be generally cylindrical in shape. The elongated collar 86 can extend through the hub 64 of the final drive gear 38. The external splines 88 can be formed along the outside of the collar 86 at an end of the collar 86 that is spaced along the axis A from the output disc 84. The external splines 88 can engage the internal splines 82 of the second carrier plate 72 so that the output member 54 can rotate at the same speed as the carrier 46.

The output member 54 can support the final drive gear 38 for rotation about the axis A. A tapered roller bearing assembly 90 can be mounted to the inside of the gear disc 62 and to the outside of the elongated collar 86 at a position adjacent to the output disc 84. A needle roller bearing assembly 92 can be mounted outside the elongated collar 86 at a position adjacent the external splines 88.

The sun gear 48 can include a gear disc 94, a sleeve 96, a spline disc 98, and a plurality of external splines 100 (see also, FIGS. 3 and 4). The gear disc 94 can be located along the axis A at a position intermediate the carrier plates 70, 72 and can include teeth (not numbered) that engage the teeth (not numbered) of each of the planet gears 50. The sleeve 96 can extend along the axis A from the gear disc 94 away from the second carrier plate 72 and toward the left side (as viewed in FIG. 2) of the housing 36. The sleeve 96 can pass through the center of and beyond the first carrier plate 70. The sleeve 96 can be generally cylindrical in shape. A ball bearing assembly 102 can be supported on the housing 36 at an end of the sleeve 96 that is furthest from the gear disc 94. The spline disc 98 can be fixed to the sleeve 96 at a position closer to the ball bearing assembly 102 than to the gear disc 94. The hub 76 of the first carrier plate 70 can be located along the axis A intermediate the spline disc 98 and the gear disc 94. The external splines 100 can be formed on the outside of the spline disc 98 and spaced at the same radial distance from the axis A as the external splines 78 formed on the first carrier plate hub 76. See also, FIG. 4.

The clutch 52 can include a clutch ring 104, an actuator groove 106, and a plurality of internal splines 108. The actuator groove 106 can be formed along an outside circumference of the clutch ring 104. An actuator (omitted for clarity in FIGS. 2-4) can be constructed in a manner known in the art and can be connected to the actuator groove 106 in a manner known in the art. The internal splines 108 can be formed along the inside of the clutch ring 104 and can selectively engage the external splines 100 of the sun gear sleeve 96, as will be discussed in detail below.

The housing 36 can include a plurality of external splines 110 formed along the left side (as viewed in FIG. 2) of the housing 36 in a circular pattern. The housing external splines 110 can be spaced at the same radial distance as the external splines 78, 100 of each of the first carrier plate hub 76 and the spline disc 98. FIG. 2 illustrates the clutch 52 in an intermediate position in which the internal splines 108 of clutch ring 104 are disengaged from the external splines 78, 110 of each of the first carrier plate 70 and the housing 36.

The low range gear assembly 40 can also include a pair of synchronizer assemblies 112, 114. The synchronizer assemblies 112, 114 can be constructed in a manner that is known in the art. The first synchronizer assembly 112 can be mounted intermediate the first carrier plate hub 76 and the spline disc 98. The first synchronizer assembly 112 can adjust the rotational speed of sun gear 48 so that it matches the rotational speed of the carrier 46. The second synchronizer assembly 114 can be mounted intermediate the left side (as viewed in FIG. 2) of the housing 36 and the spline disc 98. The second synchronizer assembly 114 can slow the rotational speed of the sun gear 48 to zero. Further interaction of the synchronizer assemblies 112, 114 with the sun gear 48, the carrier 46 and the housing 36 will be discussed below.

Operation of the clutch is now described with reference to FIGS. 3 and 4. FIG. 3 illustrates the clutch 52 in a first position in which the high range gearing position for the low range gear assembly 40 is selected. FIG. 4 illustrates the clutch 52 in a second position in which the low range gearing position for the low range gear assembly 40 is selected. As noted above, the clutch 52 can be moved between the first position and the second position by an actuator (omitted from FIGS. 3 and 4 for clarity) that can be controlled manually by the operator of the vehicle 10 or can be controlled automatically, for example, as described in co-pending U.S. patent application Ser. No. 12/847,673 (entitled Control System and Method For Automatic Selection of a Low Range Gear Ratio For A Vehicle Drivetrain), referenced above.

With reference to FIG. 3, under the normal driving conditions noted above, the clutch 52 can be placed in the first position. That is, the first position of the clutch 52 can be the default position for the clutch 52. Here, the internal splines 108 of the clutch ring 104 can engage the external splines 78, 100 of each of the carrier 46 and the sun gear 48 to place the low range gear assembly 40 into the high range gearing position. This spline engagement can rotationally lock the sun gear 48 to the carrier 46 such that the sun gear 48 and the carrier 46 rotate as a unit at the same rotational speed. In this locked state, the carrier 46 can also rotate as a unit with the ring gear 44 at the same rotational speed as the ring gear 44 because there is no relative rotation between the ring gear 44 and either of the carrier 46 and the sun gear 48 in this configuration. The output member 54 is driven at the same rotational speed as the final drive gear 38. That is, the high range final drive ratio can be equal to the ratio of the rotational speed of the final drive gear to the rotational speed of the output member 54. Of course, different drive ratios could be implemented for the high range final drive ratio depending on design and/or output requirements.

When the clutch 52 is moved from the first position to the intermediate position (see FIG. 2), the internal splines 108 of the clutch 52 can be disengaged from the external splines 78 of the carrier 46. Then, the second synchronizer assembly 114 can act on the sun gear 48 to slow the rotational speed of the sun gear 48 to substantially zero in a manner that is known in the art. Once the rotation of the sun gear 48 is slowed or stopped, the clutch 52 can be moved into the second position as shown in FIG. 4. When the clutch 52 is in the second position, the internal splines 108 of the clutch 52 can engage the external splines 100, 110 of each of the sun gear 48 and the housing 36 to place the low range gear assembly 40 into the low range gearing position. This spline engagement can rotationally lock the sun gear 48 to the housing 36. In this locked state, the carrier 46 can rotate relative to each of the ring gear 44 and the sun gear 48 such that the carrier 46 rotates at a speed that is less than the rotational speed of the ring gear 44. As a result, the rotational speed of the output member 54 can be less than the rotational speed of the final drive gear 38. By way of example, the ratio of the rotational speed of the final drive gear 38 to the rotational speed of the output member 54 (i.e., the low range final drive ratio) can be approximately 1.5:1 and can also be 1.4:1.6. Of course, other drive ratios are possible depending on design and/or output requirements.

To switch back to the high range gearing position in the low range gear assembly 40, the clutch 52 can be moved from the second position to the intermediate position (see FIG. 2). After the internal splines 108 of the clutch 52 disengage the external splines 110 of the housing 36. The first synchronizer 112 can act on the sun gear 48 to increase the rotational speed of the sun gear 48 to match the rotational speed of the carrier 46 in a manner that is known in the art. Then, the clutch 52 can slide to the right (as viewed in FIGS. 2-4) and the internal splines 108 of the clutch 52 can engage the external splines 78, 100 of the carrier 46 and the sun gear 48. The high range final drive ratio of the low range gear assembly 40 can then be selected again.

As evidenced from a comparison of FIGS. 2-4, the internal splines 108 of the clutch 52 can engage the external splines 100 of the sun gear 48 when the clutch 52 is in each of the first position, the second position, and any position intermediate the first position and the second position. That is, the internal splines 108 of the clutch 52 can engage the external splines 100 of the sun gear 48 at all positions of the clutch 52.

Returning to FIG. 2, the front differential assembly 42 can be connected to and driven by the output member 54 of the low range gear assembly 40 at the same rotational speed as the output member 54. That is, output member 54 can drive the front differential assembly 42 at a rotational speed that is a function of the selected one of the high range final drive ratio and the low range final drive ratio just described.

The front differential assembly 42 can include an input member 118 and a plurality of internal splines 120 formed on an inner circumference of the input member 118. The output member 54 can include a plurality of external splines 116 formed on the outer circumference of the output disc 84. The external splines 116 of the output member 54 can engage the internal splines 120 of the input member 118 to drive the input member 118 based on a selected one of the high range final drive ratio and the low range final drive ratio.

The front differential assembly 42 can also include a first output structure 122 secured for rotation with the left front driveshaft 16L, a second output structure 124 secured for rotation with the right front driveshaft 16R, and a plurality of gears 126 connected to each of the input member 118, the first output structure 122 and the second output structure 124. In the exemplary embodiment illustrated in FIG. 2, the input member 118 can include a ring gear 128. The first output structure 122 can be configured as a carrier, the second output structure 124 can be configured as a sun gear, and the plurality of gears 126 can be configured as a plurality of planet gears, where each of the planet gears 126, the sun gear 124, and the ring gear 128 can be configured as spur gears. Each of the planet gears 126 can be rotatably mounted to the carrier 122 and in engagement with each of the ring gear 128 and the sun gear 124. As illustrated in FIG. 2, the ring gear 128 can be integrally formed with the input member 118 to provide a single, homogenous component for the front differential assembly 42.

Alternatively, the front differential assembly 42 can be a bevel gear differential assembly known in the art where the input member can be configured as a differential carrier, each of the first and second output structures can be configured as a bevel gear, and the plurality of gears can be configured as a plurality of bevel gears that can be rotatably mounted to the differential carrier and in engagement with each of the first and second output bevel gears. An example of a known bevel gear differential assembly is disclosed in the above referenced U.S. Pat. No. 4,974,473.

Although not illustrated in detail, the rear differential assembly 22 can be similar in construction to the front differential assembly 42. Additionally, the rear differential assembly 22 and/or the front differential assembly 42 can be any differential assembly known in the art, such as an open-type differential, a limited slip differential, a viscous coupling-type differential, an electromagnetic clutch-type differential, etc.

With continued reference to FIG. 2, when the vehicle 10 is configured as a four-wheel drive vehicle, or an all-wheel drive vehicle, the housing 36 can also contain the power take-off assembly 32. The power take-off assembly 32 can drive the propeller shaft 20 based on the selected one of the high range final drive ratio and the low range final drive ratio. The power take-off assembly 32 can include an input gear 130, a stub shaft 132, a crown gear 134, and a pinion gear 136. Each of the input gear 130 and the crown gear 134 can be fixed for rotation with the stub shaft 132. The stub shaft 132 can extend parallel to the axis A. The pinion gear 136 can engage and be driven by the crown gear 134 and can be fixed for rotation to the propeller shaft 20.

Although the sun gear 48 is shown as being vertically aligned with the ring gear 44 and the single set of planet gears 50, it is contemplated that further or different gear ratios can be provided by including an additional set of planet gears. The additional set of planet gears can be offset from the first set of planet gears 50 and would include different tooth ratios and/or diameters, if desired.

The input member 118 of the front differential assembly 42 can also include a third output structure, such as but not limited to a power take-off gear 138, that can engage and drive the input gear 130. As a result, the power take-off gear 138 can also drive the power take-off assembly 32 at the selected one of the high range final drive ratio and the low range final drive ratio, and by extension, the rear wheels 26L, 26R can be driven based on the selected one of the high range final drive ratio and the low range final drive ratio. The power take-off gear 138 can be integrally formed with the input member 118 to provide a single, homogenous component.

When the vehicle 10 is configured as a front-wheel drive vehicle, the power take-off gear 138, the power take-off assembly 32, the portion of the housing 36 encasing the power take-off assembly 32, the propeller shaft 20, the rear differential assembly 22, and the rear driveshafts 24L, 24R can be omitted.

In another contemplated embodiment, the two-speed final drive assembly 30 can be configured in a mirror image to that shown in FIG. 2. In other words, the sun gear 48, planet gear 50 and ring gear 44 assembly can be located on the right hand side of the assembly 30 and the front differential assembly 42 can be located on the left hand side of the assembly 30.

Although the clutch 52 is shown as a dog-key clutch, it is contemplated that any known clutch could be used to effect transition between high range and low range, including a wet type clutch and other know clutches.

While certain embodiments of the invention are described above, it should be understood that the disclosed subject matter can be embodied and configured in many different ways without departing from the spirit and scope of the invention. For example, separate components that can be connected directly to one another and rotate at the same speed can be integrally formed as single homogenous components. Conversely, single homogenous components can be formed as disparate elements and secured together in a manner known in the art. In the exemplary embodiment disclosed above, many of the components can be secured for rotation by splined connections. However, other torque transmitting connections known in the art can be used such as threaded fasteners, keyways and keys, welded joints, etc.

In the embodiment disclosed above, the vehicle 10 is configured as a four-wheel-drive, or an all-wheel-drive, vehicle. However, the power take-off assembly 32, the propeller shaft 20, the rear differential assembly 22, and the rear driveshafts 24L, 24R can be omitted to provide a front-wheel-drive vehicle.

While a spline clutch is shown in the figures as an exemplary structure for the clutch 52, it is conceivable that a plate clutch, electromagnetic clutch, band clutch, friction clutch or other known torque transmission coupling device could be incorporated in the disclosed subject matter.

While the subject matter has been described in detail with reference to exemplary embodiments thereof, it will be apparent to one skilled in the art that various changes can be made, and equivalents employed, without departing from the scope of the invention. All related art references described above are hereby incorporated by reference in their entirety.

What is claimed is:

1. A transaxle for driving at least a pair of wheels of a vehicle that are spaced apart in a transverse direction relative to the vehicle, the transaxle assembly comprising:
   a housing;
   a low range gear assembly mounted in the housing and including,
      a ring gear mounted in the housing to rotate about an axis,
      a carrier mounted in the housing to rotate about the axis,
      a plurality of planet gears rotatably mounted on the carrier and engaging the ring gear,
      a sun gear mounted in the housing to rotate about the axis and engaging the plurality of planet gears, and
      a clutch mounted in the housing and selectively movable between a first position where the clutch engages each of the sun gear and the carrier and permits rotation of the sun gear relative to the housing and a second position where the clutch engages each of the sun gear and the housing and rotationally fixes the sun gear relative to the housing; and
   a differential gear assembly mounted in the housing and permitting at least one of the pair of wheels to rotate relative to the other of the pair of wheels.

2. The transaxle according to claim 1, wherein the clutch moves substantially parallel to the axis between the first position and the second position.

3. The transaxle according to claim 2, wherein:
   the housing includes a plurality of splines spaced at a radial distance from the axis;
   the sun gear includes a sleeve having an outer circumference and a plurality of splines formed on the outer circumference;
   the carrier includes a hub having an outer circumference and a plurality of splines formed on the outer circumference; and
   the clutch includes an inner circumference and a plurality of clutch splines formed on the inner circumference that engage the plurality of splines of the sun gear and the plurality of splines of the carrier when the clutch is in the first position and that engage the plurality of splines of the sun gear and the plurality of splines of the housing when the clutch is in the second position.

4. The transaxle according to claim 3, wherein the clutch includes:
   a first synchronizer intermediate the housing and the sun gear; and
   a second synchronizer intermediate the sun gear and the carrier.

5. The transaxle according to claim 4, wherein each of the ring gear, the carrier and the sun gear are positioned along the axis intermediate the clutch and an input member.

6. The transaxle according to claim 1, wherein the housing includes a first side and a second side spaced from the first side along the axis, and
   the low range gear assembly is mounted along the axis adjacent to the first side and the differential gear assembly is mounted along the axis adjacent to the second side.

7. The transaxle according to claim 6, further comprising a final drive gear mounted in the housing for rotation about the axis, located along the axis intermediate the low range gear assembly and the differential gear assembly, and including:
   a gear disc adjacent to an input member; and
   a hub connected to the gear disc, extending from the gear disc toward the low range gear assembly, connected to and driving the ring gear, and rotatably supported on the housing.

8. The transaxle according to claim 7, wherein the low range gear assembly further includes:
   an input disc intermediate the hub and the ring gear and connected to and driving the ring gear; and
   a collar connected to and extending from the input disc toward the gear disc along the axis and connected to and driven by the hub.

9. The transaxle according to claim 8 wherein the low range gear assembly further includes:
   an output disc mounted in the housing for rotation about the axis, located along the axis intermediate the gear disc and the input member, and connected to and driving the input member; and
   a second collar including a first end connected to the carrier and driven by the carrier and a second end connected to the output disc, wherein the second collar extends into each of the hub and the collar.

10. The transaxle according to claim 9, wherein the second collar rotatably supports the gear disc at a position along the second collar adjacent to the output disc.

11. The transaxle according to claim 9, wherein the carrier includes a sleeve connected to and driving the second collar, extending through the collar, and extending into the hub.

12. The transaxle according to claim 11, wherein the first drive shaft passes through each of the output disc, the second collar, the gear disc, the hub, the sleeve, the collar, the input disc, the ring gear, the sun gear, the second carrier plate, and the clutch.

13. The transaxle according to claim 9, wherein the input member includes:
   an outer circumference;
   a first plurality of teeth formed on the outer circumference;
   a first inner circumference;
   a second plurality of teeth formed on the first inner circumference and engaging a gear; and
   a second inner circumference intermediate the outer circumference and the first inner circumference and connected to and driven by the output disc.

14. The transaxle according to claim 13, further comprising a power take-off assembly including:
   a stub shaft rotatably mounted in the housing about a second axis spaced from the axis;
   an input gear connected to the stub shaft and engaging the first plurality of teeth;
   a crown gear connected to and driven by the stub shaft;
   a pinion gear engaging and driven by the crown gear; and
   a propeller shaft connected to and driven by the pinion gear.

15. The transaxle according to claim 1, further comprising:
a multi-ratio transmission assembly including,
- a plurality of forward drive ratios,
- a reverse drive ratio, and
- an output gear connected to the ring gear when the clutch is in each of the first position and the second position to drive the ring gear based on a selected one of the forward drive ratios and the reverse drive ratio; and a final drive gear mounted in the housing for rotation about the axis, located along the axis intermediate the carrier and the differential input, engaging the output gear, driving the ring gear, and mounted in the housing for rotation about the axis, wherein the low range gear assembly further includes an output member connected to the carrier and driving the input member at one of a high range final drive ratio and a low range final drive ratio that is less than the high range final drive ratio, and the high range final drive ratio is determined by the output gear, the final drive gear, and the first position of the clutch and is independent of each of the plurality of forward drive ratios and the reverse drive ratio, and the low range final drive ratio is determined by the output gear, the final drive gear, and the second position of the clutch and is independent of each of the plurality of forward drive ratios and the reverse drive ratio.

16. The transaxle according to claim 1, wherein the input member, first driveshaft, and second driveshaft each have a rotational axis coinciding with the axis of the low range gear assembly such that each of an input member, first driveshaft, and second driveshaft rotate about the axis of the low range gear assembly.

17. The transaxle according to claim 1, wherein the axis of the low range gear assembly extends substantially parallel with the transverse direction of the vehicle.

18. The transaxle according to claim 1, wherein, the differential assembly includes,
- an input member mounted in the housing and driven by the carrier,
- a first output structure and a second output structure, each connected to and driven by the input member,
- a first driveshaft mounted in the housing, connected to the first output structure and a first one of the pair of wheels, and passing through each of the ring gear, the carrier, and the sun gear, and
- a second driveshaft mounted in the housing and connected to the second output structure and a second one of the pair of wheels.

19. A powertrain assembly for a vehicle comprising:
a front pair of wheels spaced apart in a transverse direction relative to the vehicle;
a rear pair of wheels spaced apart in the transverse direction and spaced from the front pair of wheels in a longitudinal direction relative to the vehicle;
an internal combustion engine;
a multi-ratio transmission driven by the engine, and including,
- a plurality of forward drive ratios,
- a reverse drive ratio, and
- an output gear rotating about an output axis;

a final drive gear mounted in the housing for rotation about a drive axis and engaging and driven by the output gear;
a low range gear assembly including,
- a ring gear mounted in the housing to rotate about the drive axis and connected to and driven by the final drive gear,
- a carrier mounted in the housing to rotate about the drive axis,
- a plurality of planet gears rotatably mounted on the carrier and engaging the ring gear,
- a sun gear mounted in the housing to rotate about the drive axis and engaging the plurality of planet gears,
- a clutch mounted in the housing and selectively movable between a first position where the clutch engages each of the sun gear and the carrier and permits rotation of the sun gear relative to the housing and a second position where the clutch engages each of the sun gear and the housing and rotationally fixes the sun gear relative to the housing, and
- an output member connected to the carrier and driven by the carrier at one of a high range final drive ratio and a low range final drive ratio that is less than the high range final drive ratio, wherein
- the high range final drive ratio is determined by the output gear, the final drive gear, and the first position of the clutch and is independent of each of the plurality of forward drive ratios and the reverse drive ratio, and the low range final drive ratio is determined by the output gear, the final drive gear, and the second position of the clutch and is independent of each of the plurality of forward drive ratios and the reverse drive ratio;

a front differential gear assembly including,
- an input member mounted in the housing to rotate about the drive axis and driven by the output member,
- a first output structure and a second output structure, each connected to and driven by the input member,
- a first driveshaft mounted in the housing to rotate about the drive axis, connected to the first output structure and a first one of the pair of wheels, and passing through each of the ring gear, the carrier, and the sun gear,
- a second driveshaft mounted in the housing to rotate about the drive axis and connected to the second output structure and a second one of the pair of wheels, and
- a third output structure;

a power take-off gear assembly including,
- a crown gear driven by the third output structure to rotate about a power take off axis,
- a pinion gear engaging the crown gear and rotatable about a propeller axis substantially perpendicular to the power take off axis;

a propeller shaft driven by the pinion gear;
a rear differential gear assembly driven by the propeller shaft;
a first rear driveshaft connected to and driven by the rear differential gear assembly and connected to and driving a first one of the rear pair of wheels; and
a second rear driveshaft connected to and driven by the rear differential gear assembly and connected to and driving a second one of the rear pair of wheels.

20. The transaxle according to claim 19, wherein the clutch moves parallel to the drive axis between the first position and the second position.

21. The transaxle according to claim 20, wherein:
the housing includes a plurality of splines spaced at a radial distance from the drive axis;
the sun gear includes a sleeve having an outer circumference and a plurality of splines formed on the outer circumference;

the carrier includes a hub having an outer circumference and a plurality of splines formed on the outer circumference; and the clutch includes an inner circumference and a plurality of clutch splines formed on the inner circumference that engage the plurality of splines of the sun gear and the plurality of splines of the carrier when the clutch is in the first position and that engage the plurality of splines of the sun gear and the plurality of splines of the housing when the clutch is in the second position.

22. The transaxle according to claim 21, wherein the clutch includes:

a first synchronizer intermediate the housing and the sun gear; and a second synchronizer intermediate the sun gear and the carrier.

23. The transaxle according to claim 22, wherein each of the ring gear, the carrier and the sun gear are positioned along the drive axis intermediate the clutch and the input member.

24. The transaxle according to claim 19, wherein the drive axis extends substantially perpendicular to the longitudinal direction of the vehicle.

\* \* \* \* \*